Jan. 26, 1971  K. R. KLIPPEL  3,558,768
SUSTAINED RELEASE PHARMACEUTICAL COMPOSITIONS
Filed Dec. 19, 1969
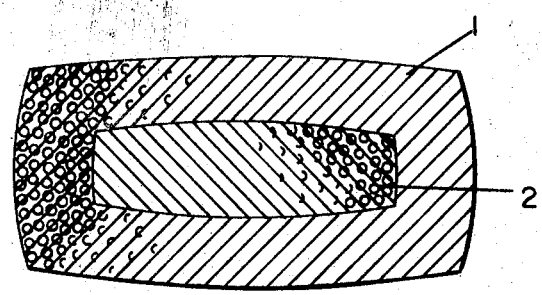
INVENTOR
KENNETH R. KLIPPEL
BY Charles R. Fay
ATTORNEY United States Patent Office 3,558,768
Patented Jan. 26, 1971

3,558,768
SUSTAINED RELEASE PHARMACEUTICAL COMPOSITIONS
Kenneth R. Klippel, Clarkstown Township, Rockland County, N.Y., assignor to Sterling Drug Inc., New York, N.Y., a corporation of Delaware
Continuation-in-part of application Ser. No. 548,882, May 10, 1966. This application Dec. 19, 1969, Ser. No. 886,480
Int. Cl. A61k 27/12
U.S. Cl. 424—21     8 Claims

ABSTRACT OF THE DISCLOSURE

Oral sustained release pharmaceutical compositions comprising a tablet composed of a core comprising a medicament distributed in a matrix consisting of a compressed blend of a hydrophilic gum and corn protein and a shell comprising a medicament distributed in a matrix consisting of a compressed blend of hydrophilic gums.

---

This application is a continuation-in-part of my prior copending application Ser. No. 548,882, filed May 10, 1966 now abandoned.

This invention relates to pharmaceutical preparations and is more particularly concerned with blends of hydrophilic gums and corn protein which are combined with therapeutically active materials and compressed into tablets containing a core and shell, each of said core and shell comprising the active material and the tablet ingredients, and which afford sustained release of the active material in oral pharmaceutical preparations.

Prior to the invention herein described it has been proposed to sustain the release of therapeutically active materials over a prolonged period of time by a number of different methods. One such method involves the coating of active materials with varying thicknesses of relatively insoluble chemicals while another method involves the imbedding of the active materials in the matrices of polymeric substances. Other well-known methods employ fats and waxes, ion-exchange resins or insoluble salts to prolong the dissolution of active materials. The sustained release preparations resulting from the utilization of these methods suffer from one or more disadvantages. In some instances the amount of active material released varies from individual to individual and, in part at least, seems to be a function of the pH of the environment. In other instances, the release rate of the active material cannot be controlled to obtain a desired release pattern. Still other dosage forms are obtainable only after careful and tedious compounding of the ingredients in multi-step processes.

In accordance with the present invention there are provided sustained release blends of medicaments with synthetic and natural hydrophilic gums together with corn protein, which can be dispensed in dosage units by press coating them in the form of tablets composed of a core and shell prepared by conventional press coating techniques. Thus there is afforded a unit dosage preparation for oral administration containing a therapeutically active ingredient which is released at a controlled rate and, by virtue of the independent control of the release rates of both the core and shell separately, it is possible to obtain a multiplicity of different release patterns. The tablets of the invention are adaptable to a wide range of therapeutic compounds having different physical and chemical properties, and release the medicament agent independent of the pH of the gastrointestinal environment.

More specifically, the invention provides a sustained release tablet composed of a core comprising a medicament distributed in a matrix consisting of a compressed blend of a synthetic gum of the cellulose ether type, preferably methyl cellulose, and corn protein, for example zein, and a shell comprising a medicament distributed in a matrix consisting of a compressed blend of a synthetic gum of the cellulose ether type, preferably methyl cellulose, and at least two natural hydrophilic gums, for instance, karaya, pectin, and sodium alginate, but preferably the latter two. The active ingredient: inert material ratio in each of the core and shell separately and in the core and shell together is between 1:1 to 1:20. The preferred embodiment of the invention contemplates methyl cellulose in conjunction with zein in the core of the tablet, and methyl cellulose in conjunction with pectin and sodium alginate in the shell. A particularly preferred embodiment is one in which the shell comprises a blend containing methyl cellulose, pectin, and sodium alginate in a weight ratio of from 1:1:1 to 1:4:4. In this embodiment, the synthetic gum-natural gum blend of the shell or the synthetic gum-corn protein blend of the core represents between about 20–75% by weight of the weight of the shell or core weight granules, respectively, and the synthetic gum:natural gum weight ratio of the shell is preferably between about 1:2 to about 1:8, while the synthetic gum:corn protein weight ratio of the core is preferably between about 1:1 to 1:2.

Optionally a portion of the essential ingredients of the core and shell, up to one-third of the matrix by weight, can be replaced by conventional inert diluents, for example lactose, talc, sucrose, starch, and by about 1–3% by weight of a lubricant, for example, magnesium stearate, calcium stearate, or sodium lauryl sulfate, without adversely affecting the desired result.

While the invention is not to be limited by a particular explanation of the mechanism of action, it is believed the sustained release characteristics of the presently described tablets are due to a combined action of diffusion and erosion. Thus, the gum blend of the shell portion when exposed to the gastrointestinal fluids, hydrates to form a mucilagenous gel barrier through which the medicament is slowly released by diffusion with concomitant erosion of the outer portions of the gel layer. As the gastrointestinal fluids penetrate further into the shell portion, more gel layer is formed around the core tablet with the core tablet acting as a reservoir releasing the medicament into the gel layer of the shell portion to maintain the overall desired release pattern of the core-shell tablet combination.

The granules prepared according to the present invention may be compressed in conventional manner into tablets of any convenient size or shape, neither of which aspects are critical to the invention. The accompanying drawing, in which the numeral 1 refers to the shell and the numeral 2 refers to the core, illustrates an embodiment of the invention.

Therapeutically-active ingredients which are suitable in the tablet formulations of the present invention include a wide variety of medicaments for example, antispasmodics, e.g. penthienate bromide, atropine, hyoscyamine and the like; barbiturates, e.g. phenobarbital, mephobarbital and the like; antihistamines e.g. dethylandiamine hydrochloride, thonzylamine hydrochloride, thenyldiamine hydrochloride and the like; analgesics, e.g. meperidine, pentazocine, acetylsalicylic acid and the like; vasopressors, e.g. levarterenol bitartrate, phenylephrine hydrochloride, isoproterenol hydrochloride and the like; vasodilators, e.g. glyceryl trinitrate, pentaerythritol tetranitrate and the like; vitamins; hormones; antibiotics; and other anti-infective, sedative, hypnotic, hypotensive, etc. drugs. The dosage of the medicaments can be varied as desired with the percentage by weight of the medicament ranging from about 5% to about 50% by weight of the finished tablet weight. That is the weight ratio of the active ingredient to the inert ingredients as contained in the core and shell together is between 1:1 to 1:20.

The gum blend of either the core or shell of the present invention can represent as little as about 20% by weight or as much as about 75% by weight of the granule weight depending upon the dosage of active material required. The synthetic gums of the cellulose ether type include, for example, methyl cellulose, hydroxyethyl cellulose, carboxymethyl cellulose, and hydroxypropyl cellulose, while the natural gums contemplated can include, for example, acacia, pectin, guar gum, psyllium, locust bean gum, sodium alginate, karaya, etc.

The following examples will further illustrate the invention.

EXAMPLE 1

Compressed-coated tablets containing the following ingredients on a per tablet basis were prepared using conventional wet granulation procedures.

Core: Mg./tablet
- Isoproterenol HCl _____ 15.00
- Sodium bisulfite _____ 0.75
- Methyl cellulose _____ 22.50
- Zein _____ 31.50
- Talcum _____ 3.75
- Sodium lauryl sulfate _____ 1.50

75.00

Shell:
- Isoproterenol HCl _____ 15.00
- Sodium bisulfite _____ 2.00
- Methyl cellulose _____ 11.40
- Sodium alginate _____ 41.00
- Pectin _____ 41.00
- Powdered sucrose _____ 48.00
- Sodium lauryl sulfate _____ 1.60
- Calcium stearate _____ 2.00

162.00

The completed granulation was compressed by conventional press coating methods into tablets each weighing 237 mg. Release was determined in simulated body fluids by a standard method using 0.084 N hydrochloric acid and pH 7.5 phosphate buffer. At periodic intervals a sample was removed and the percent of medicament released determined with the following results:

Exposure time (at end of): Cumulative percent released
- 1st hr. in gastric fluid _____ 30.5
- 2nd hr. in intestinal fluid _____ 46.2
- 3rd hr. in intestinal fluid _____ 63.7
- 4th hr. in intestinal fluid _____ 76.4
- 5th hr. in intestinal fluid _____ 86.9
- 6th hr. in intestinal fluid _____ 93.8
- 7th hr. in intestinal fluid _____ 96.9

EXAMPLE 2

Tablets identical to those described in Example 1 but containing a lower, i.e. 15 mg. dosage of isoproterenol were prepared by reducing the amount of isoproterenol in both the core and shell by 7.5 mg. and substituting in each instance an equal weight of lactose. The release rate of the tablets was as follows:

Exposure time (at end of): Cumulative percent released
- 1st hr. in gastric fluid _____ 19.8
- 2nd hr. in intestinal fluid _____ 31.8
- 3rd hr. in intestinal fluid _____ 45.8
- 4th hr. in intestinal fluid _____ 60.3
- 5th hr. in intestinal fluid _____ 71.2
- 6th hr. in intestinal fluid _____ 80.3
- 7th hr. in intestinal fluid _____ 86.6

EXAMPLE 3

Compressed-coated tablets containing phenylephrine hydrochloride were prepared using conventional wet granulation techniques and the following ingredients per tablet:

Core: Mg./tablet
- Phenylephrine HCl _____ 25.00
- Sodium bisulfite _____ 0.75
- Methyl cellulose _____ 30.00
- Zein _____ 37.25
- Talcum _____ 5.00
- Sodium lauryl sulfate _____ 2.00

100.00

Shell:
- Phenylephrine HCl _____ 25.00
- Sodium bisulfite _____ 2.00
- Methyl cellulose _____ 19.10
- Sodium alginate _____ 68.50
- Pectin _____ 68.50
- Powdered sucrose _____ 79.25
- Sodium lauryl sulfate _____ 2.65

265.00

The completed granulation was compressed by conventional press coating methods into tablets each weighing 365 mg. The release rate of the tablets was as follows:

Exposure time (at end of): Cumulative percent released
- ½ hr. in .084 N HCl _____ 17.0
- 1 hr. in .084 N HCl _____ 24.6
- 2nd hr. in pH 7.5 phosphate buffer _____ 33.8
- 3rd hr. in pH 7.5 phosphate buffer _____ 43.8
- 4th hr. in pH 7.5 phosphate buffer _____ 54.6
- 5th hr. in pH 7.5 phosphate buffer _____ 66.5
- 6th hr. in pH 7.5 phosphate buffer _____ 75.0
- 7th hr. in pH 7.5 phosphate buffer _____ 85.5

I claim:
1. An oral sustained release pharmaceutical preparation comprising a tablet composed of a core comprising a medicament distributed in a matrix consisting of a compressed blend of a synthetic hydrophilic gum of the cellulose ether type and corn protein, and a shell comprising a medicament distributed in a matrix consisting of a compressed blend of a synthetic hydrophilic gum of the cellulose ether type and at least two natural hydrophilic gums.

2. An oral sustained release preparation according to claim 1 comprising a tablet composed of a core comprising a medicament distributed in a matrix consisting of a compressed blend of methyl cellulose and zein and a shell comprising a medicament distributed in a matrix consisting of a compressed blend of methyl cellulose, sodium alginate, and pectin.

3. A preparation according to claim 2 wherein the weight ratio of the active ingredient to the inert ingredients as contained in the core and the shell together is between 1:1 to 1:20.

4. A preparation according to claim 2 wherein the methyl cellulose-zein blend of the core or the methyl cellulose-natural gum blend of the shell represents from 20-75% by weight of the weight of the shell or core weight granules, respectively.

5. A preparation according to claim 2 wherein the methyl cellulose:natural gum weight ratio of the shell is between 1:2 and 1:8, and the weight ratio of the methyl cellulose:zein weight ratio of the core is between 1:1 and 1:2.

6. A preparation according to claim 5 wherein the methyl cellulose:sodium alginate:pectin weight ratio of the shell is between 1:1:1 and 1:4:4.

7. A preparation according to claim 6 wherein the therapeutically active ingredient is isoproterenol.

8. A preparation according to claim 6 wherein the therapeutically active ingredient is phenylephrine.

References Cited

UNITED STATES PATENTS

| | | | |
|---|---|---|---|
| 3,065,143 | 11/1962 | Christenson et al. | 424—22 |
| 3,133,863 | 5/1964 | Tansey | 424—22 |

SHEP K. ROSE, Primary Examiner

U.S. Cl. X.R.

424—22